Figure 7:
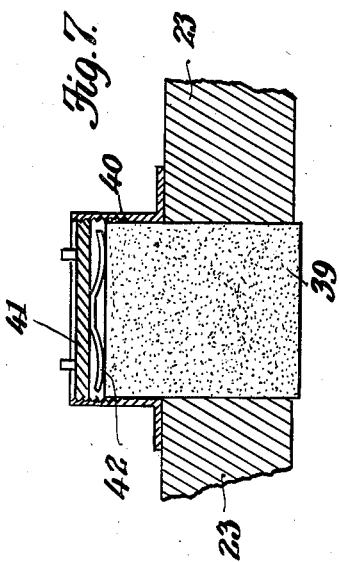

Oct. 19, 1948.    U. K. GARDNER    2,451,729
FLANGE FACING TOOL
Filed Oct. 19, 1944    3 Sheets-Sheet 1
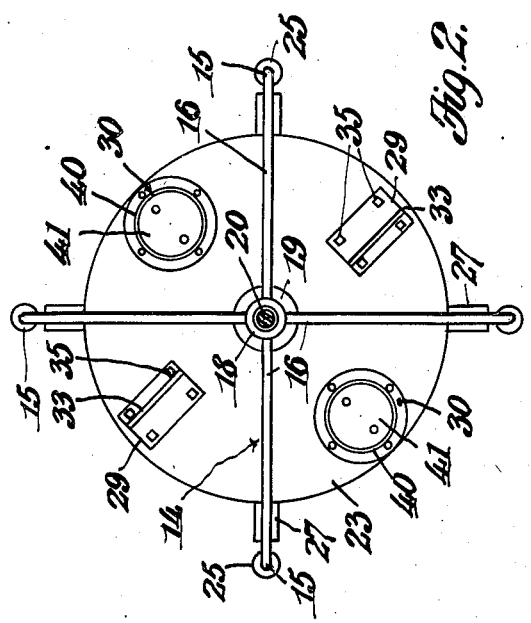
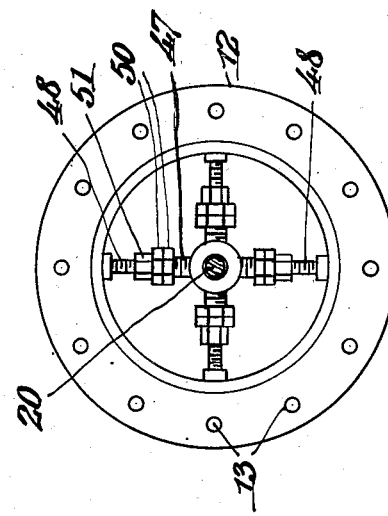
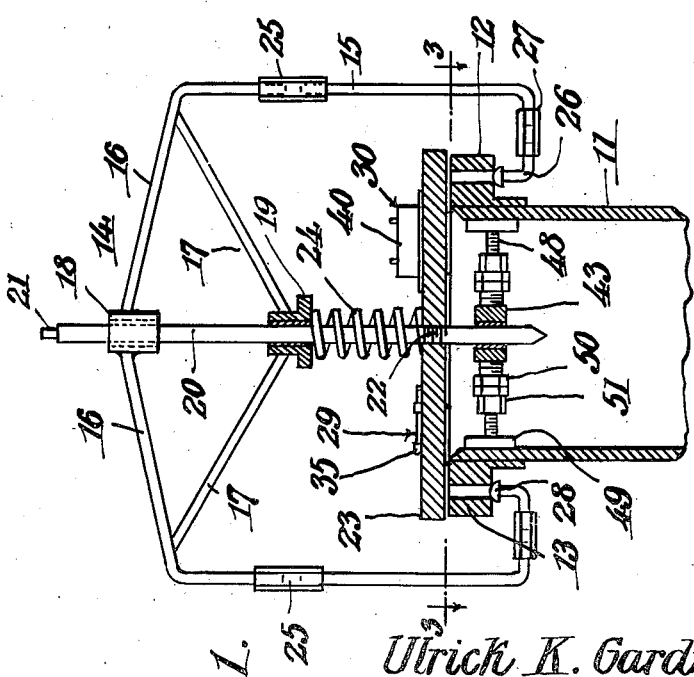
Inventor
Ulrich K. Gardner,
By
Attorney Oct. 19, 1948.  U. K. GARDNER  2,451,729
FLANGE FACING TOOL
Filed Oct. 19, 1944  3 Sheets-Sheet 2

Inventor
Ulrich K. Gardner,
By Douglas Barr
Attorney

Oct. 19, 1948.　　　U. K. GARDNER　　　2,451,729
FLANGE FACING TOOL

Filed Oct. 19, 1944　　　　　　　　3 Sheets-Sheet 3

Inventor
Ulrich K. Gardner,

By

Attorney

Patented Oct. 19, 1948

2,451,729

UNITED STATES PATENT OFFICE 2,451,729

FLANGE FACING TOOL

Ulrick K. Gardner, Montgomery, Ala.

Application October 19, 1944, Serial No. 559,465

4 Claims. (Cl. 51—241)

This invention relates to flange facing tools, the primary object of which is to provide means whereby the flange of a pipe may be refaced or trued by simple and effective means and without the necessity of dismantling or disturbing the pipe at its location.

A further object of the invention is to provide a flange facing tool of such construction and arrangement that it may be readily and easily adjusted to accommodate itself to flanges of various sizes.

A further object of the invention is to provide means of simplified and improved nature to enable the flange dressing tool to be properly centered with respect to the pipe upon which it is to operate.

A further object of the invention is to provide a portable flange facing tool equipped with planes and hones so arranged as to be capable of adjustment within their supporting member.

A further object of the invention is to provide a flange facing tool possessing the foregoing characteristics and which is capable of being operated either by hand or by power means.

With the foregoing objects in view, together with others which will appear as the description proceeds, the invention consists in the novel construction, combination and arrangements of parts, all as will be described more fully hereinafter, illustrated in the drawing, and particularly pointed out in the claims.

Figure 8:
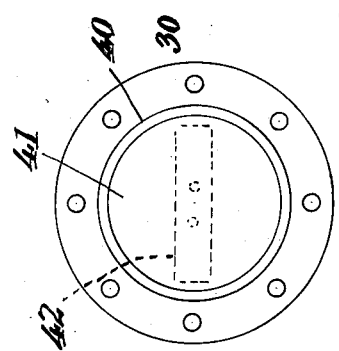
Figures 4, 5:
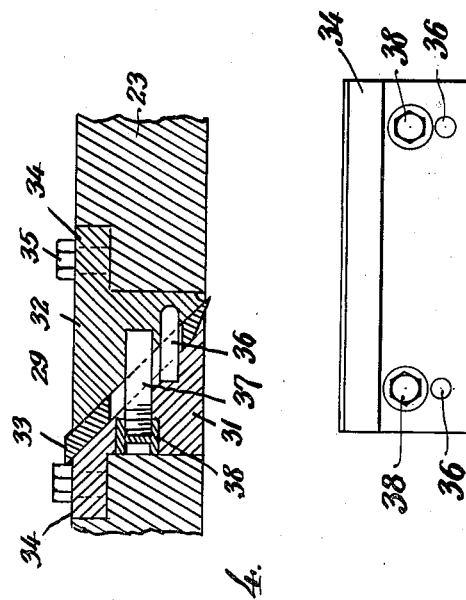
Figure 6:
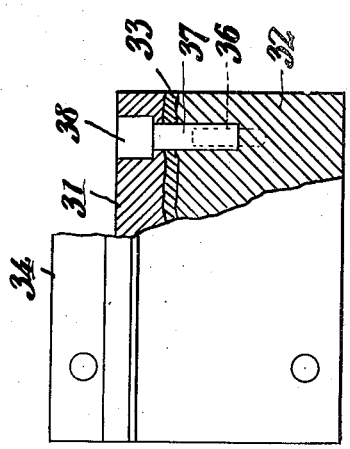
Figure 9:
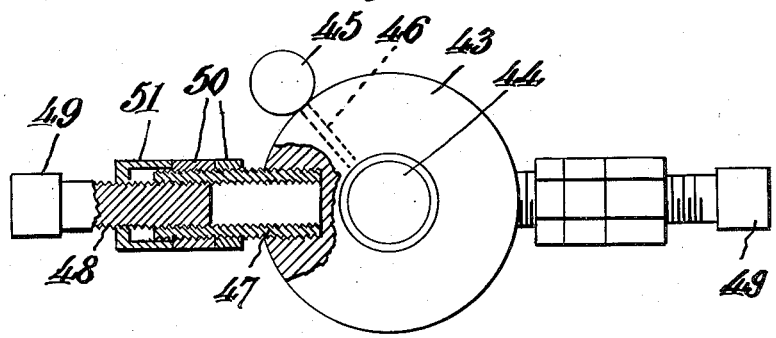
Figure 10:
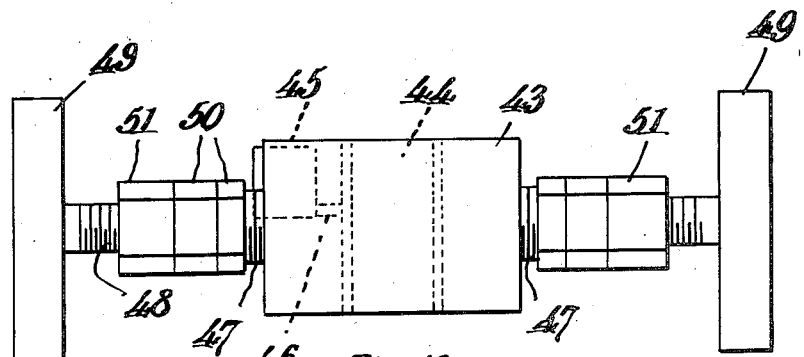

In the drawing:

Fig. 1 is a longitudinal sectional view taken through a conventional pipe end and showing, in section, as applied thereto a flange facing tool embodying the invention, Fig. 2 is a top plan view of the device shown in Fig. 1, Fig. 3 is a transverse sectional view taken substantially upon line 3—3 of Fig. 1, Fig. 4 is an enlarged fragmentary sectional view taken through the facing plate and illustrating the construction of the plane, Fig. 5 is a side elevation of the plane removed from the plate, Fig. 6 is a top plan view, parts broken away, of the plane member, Fig. 7 is a fragmentary view taken through the plate and illustrating the manner in which the hone is associated therewith, Fig. 8 is a top plan view of the hone, Fig. 9 is a top plan view, parts in section, of a development of the centering device for the facing tool, and Fig. 10 is a side elevation of the centering device shown in Fig. 9.

The invention consists essentially in a bracket and flange facing element supported thereby, of comparatively light weight and capable of being easily manipulated and applied to a protruding end of a pipe for the purpose of dressing or facing the flange thereof, and wherein the bracket is easily and quickly assembled and centered upon the pipe end and supported thereby in such manner as to insure a proper truing or facing of the flange when the plane and hone carrying plate of the instrument is rotated. The instrument may be designed as a facing tool for hand operation, or power means may be supplied for rotating the facing tool. Associated with the tool is pressure means for constantly exerting the requisite tension or pressure upon the facing implements to bring about a proper dressing of the face operated upon.

Referring now to the drawing more in detail, a conventional form of pipe is indicated at 11, the pipe having the outwardly directed flange 12 at its end, having an annular series of bolt openings 13 as will be understood.

The facing instrument includes a bracket represented generally at 14, including a spider consisting of parallel arms 15 supported by radiating members 16 and 17 of the spider member. The radiating members 16—17 are permanently connected to bearing members 18—19 disposed centrally and in longitudinal alignment in the bracket, and it will be understood that these bearings may include the usual Babbitt metal to obviate wear and to provide the necessary lubricant. A central operating shaft 20 is loosely supported within the aligned bearings 18—19, and is equipped at its outer end with a shoulder or squared portion 21 or other coupling means for the application either of a crank for hand operation or for the attachment thereto of power mechanism for rotating the shaft.

The shaft 20 has rigidly secured thereto, as by threads 22, a facing plate 23 of sufficient diameter to cover or to span the end of the pipe to be dressed or faced. An expansion spring 24 of proper tensile strength encircles the shaft 20 and is interposed between the bearing 19 and the plate 23.

The arms 15 are divided, as shown, and a turn buckle or connecting member 25 secures the adjacent ends of the arm members together. Rotation of the turn buckles 25 permits extension or contraction of the arms, within limits, as will be understood. The outer ends of the arms 15 are directed inwardly to provide claw members 26, which members are also broken and connected by turn buckles 27 to permit of their extension and contraction. The extreme ends of the claw members are inturned and disposed parallel to the arms 15 as indicated, and the extremities of these portions 28 are rounded as shown to seat within the ends of the bolt openings 13 and the flange 12.

From this construction it is apparent that the bracket which carries the shaft 20 and the dressing plate 23, may be quickly and easily adjusted to the pipe end, and after proper adjustment of the turn buckles 25—27, the tensile strength of the spring 24 will force the plate 23 into frictional contact with the flange end.

The plate 23 is provided with plane and hone members 29—30 respectively, preferably alternately arranged in circular series upon the plate. These plane and hone members project through the plate from the exterior thereof so that their operative faces contact the face of the pipe flange as the plate 23 is rotated. These elements, as will be understood, perform the cutting, dressing and truing action upon the pipe flange. The plane members 29 are shown more in detail in Figures 4-5 and 6. The body of the plane member includes a pair of mating sections 31—32, angularly cut upon their coacting faces to receive between them in angular position a cutting blade 33. The sections 31—32 are equipped at their upper ends with longitudinally extended shoulders 34, through which pass bolts 35 to firmly secure the assembled plane within a recess or opening within the plate 23. The assembled plane member is so designed as to rigidly and firmly seat within the plate with the cutting edge of the blade protruding beyond the outer face thereof a sufficient distance to perform the necessary cutting action as the plate rotates. Various means may be provided for assembling the plane sections and the blade together, and the means herein disclosed consists of dowel pins 36 rigidly secured to one section and extending into a socket of the mating section, and also stud bolts 37 rigidly secured to one member and extending through the opposite member to have its threaded end engaged by a securing nut 38. The dowel and stud members thus assure proper assemblage of the mating sections and tightening of the nut 38 will secure the two sections together with the blade 33 rigidly secured between them. The construction also permits of ready adjustment of the blade 33 when occasion requires.

The details of the hone members are shown in Figures 7 and 8. The plate member 23 is provided with lateral openings to receive therein hone elements 39, in the present instance preferably of cylindrical formation. These hone elements are of sufficient length to extend entirely through the plate opening and to protrude beyond the outer face thereof, having the protruding end enclosed in a cap 40 bolted or screwed to the plate 23. The cap is internally threaded as shown to receive a cap screw 41 having a flat spring 42 on the inner face thereof to contact the adjacent end of the hone 39. This construction insures a rigid holding of the hone member and rotation of the cap screw 41 permits of adjustment of the hone member as well as to regulate the degree of pressure of the hone member against the face of the work.

In order that the bracket and the parts carried thereby may be properly and accurately centered with respect to the pipe to be operated upon, a centering tool or head is provided. This head includes an annular member 43, having a central opening 44, provided with suitable bearing material, to receive and rotatably support the end of the shaft 20. The bearing for the shaft end may be lubricated in any desired manner, a conventional cup 45 and lead opening 46 being shown in Figures 9 and 10. Radiating from the centering head 43 are externally and internally threaded sleeves 47. These sleeves threadedly receive centering posts 48 having their outer ends provided with feet 49 to engage the inner face of the pipe 11. Lock nuts 50 are engaged upon the exterior threads of the sleeves 47, while a lock nut 51 is threadedly engaged with the post 48 and is adapted at its inner end to contact with the outermost of the lock nuts 50. From this construction it is apparent that the lengths of the centering members may be adjusted. The sleeve 47 may be adjusted in the head 43, while the post 48 may be adjusted longitudinally of the sleeve 47, and the lock nuts may be tightened to rigidly maintain these adjustments. Figure 3 of the drawings illustrates the centering head provided with a plurality of adjustable radiating arms, while Figures 9 and 10 show but a single pair of diametrically opposite arms of this character, and it will be understood that either construction may be employed. With the centering element properly positioned within the pipe end and the axis of the head 44 aligned with the axis of the pipe, proper centering of the bracket and the cutting plate will be assured.

From the foregoing, it is apparent that a flange facing tool so constructed will be capable of performing the several objects sought. Once the planes and hones are properly adjusted within the plate 23, and the bracket is centered and secured upon the pipe end, rotary movement applied to the shaft 20 will cause the blade and hone members to successively operate upon the adjacent flange face to true or dress the latter. The parts which go to make the complete instrument are of extremely simple construction and the adjustments may be quickly and accurately made without the exercise of special skill or knowledge, and while the structure herein disclosed appears at this time to be that preferred, it will be understood that changes or variations in such parts and assemblage may be resorted to if found expedient without departing from the spirit of the claims hereto annexed.

I claim:

1. In a flange facing tool, a bracket, extensible arms projecting from said bracket, longitudinally extensible claw members at the ends of said arms, bearings centrally aligned in said bracket and disposed parallel with said arms, a shaft rotatably mounted in said bearings, a plate secured to said shaft, dressing tools carried by said plate, and an expansion spring encircling said shaft and interposed between said plate and one of said bearings.

2. In a flange facing tool, a plate having an opening therein, a cap secured to said plate and having an interior opening coinciding with said plate opening, a cap screw threaded in said cap, a hone element in said cap and protruding through said plate opening, and a spring on said cap screw engaged with said hone element.

3. In a flange facing tool, a bracket, arms projecting from said bracket in spaced parallel relationship, claw members projecting inwardly from the ends of said arms, bearings centrally aligned in said bracket and parallel with said arms, a shaft mounted in said bearings, a plate secured to said shaft, a dressing tool carried by said plate, and a spring interposed between said plate and one of said bearings.

4. In a flange facing tool, a bracket, arms projecting from said bracket, claw members at the ends of said arms, bearings centrally aligned in said bracket and parallel with said arms, a shaft rotatably and slidably mounted in said bearings, a plate secured to said shaft, a dressing tool carried by said plate, and a spring interposed between said plate and one of said bearings.

ULRICK K. GARDNER.

REFERENCES CITED

The following references are of record in the file of this patent:

UNITED STATES PATENTS

| Number | Name | Date |
| --- | --- | --- |
| 279,001 | Morris | June 5, 1883 |
| 1,313,034 | Williams | Aug. 12, 1919 |
| 1,933,677 | Moore | Nov. 7, 1933 |
| 2,180,640 | Mikalson | Nov. 21, 1939 |
| 2,188,720 | McQuade | Jan. 30, 1940 |
| 2,297,074 | Rohrdanz | Sept. 29, 1942 |
| 2,318,262 | Smith | May 4, 1943 |
| 2,364,506 | Berezny | Dec. 5, 1944 |

FOREIGN PATENTS

| Number | Country | Date |
| --- | --- | --- |
| 377,445 | Germany | June 18, 1923 |